US007351900B2

(12) United States Patent
May

(10) Patent No.: US 7,351,900 B2
(45) Date of Patent: Apr. 1, 2008

(54) DRUM KEY HAVING DEPLOYABLE HANDLE

(76) Inventor: Randall L May, 2 Trafalgar, Newport Beach, CA (US) 92660-6830

( * ) Notice: Subject to any disclaimer, the term of this patent is extended or adjusted under 35 U.S.C. 154(b) by 22 days.

(21) Appl. No.: 11/485,732

(22) Filed: Jul. 13, 2006

(65) Prior Publication Data

US 2008/0022840 A1 Jan. 31, 2008

(51) Int. Cl.
*G01D 13/02* (2006.01)

(52) U.S. Cl. .......................................................... 84/413

(58) Field of Classification Search .............. 84/411 R, 84/421, 433
See application file for complete search history.

(56) References Cited

U.S. PATENT DOCUMENTS 2,132,105 A 10/1938 Gladstone
D166,457 S 4/1952 Dreyfuss
4,208,942 A 6/1980 Henrit
5,193,418 A 3/1993 Behrenfeld
D346,100 S 4/1994 Behrenfeld
5,394,775 A 3/1995 Fagerstrom
D404,986 S 2/1999 Mahon
D407,895 S 4/1999 Staley
D472,114 S 3/2003 Palecki et al.
2003/0159550 A1* 8/2003 Shigenaga .................. 81/437
2005/0056137 A1* 3/2005 DiPietro .................. 84/411 R

* cited by examiner

*Primary Examiner*—Kimberly Lockett
(74) *Attorney, Agent, or Firm*—Kirk A. Buhler; Buhler & Associates

(57) ABSTRACT

A drum key for adjusting the bolts that secure and tune the drum heads or skin that close one or more ends of a drum. The key is constructed in an elongated body with one end having a socket configured for engaging onto the head of a tightening bolt used to tighten and tune the drum head or skin. When the body of the key is articulated arms or wings embodied within the body of the key extend, deploy or spread to provide a leaver arm for tightening the tuning bold on a drum. After the tightening and or tuning operation is complete, the arms or wings are securable back within the body of the drum key.

19 Claims, 4 Drawing Sheets

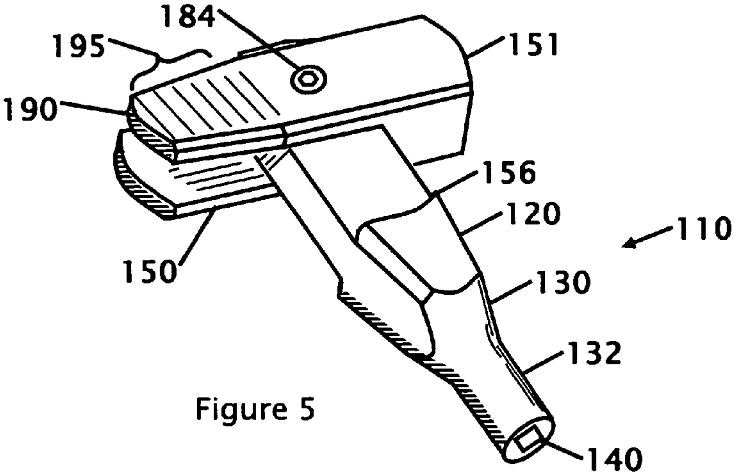
Figure 5
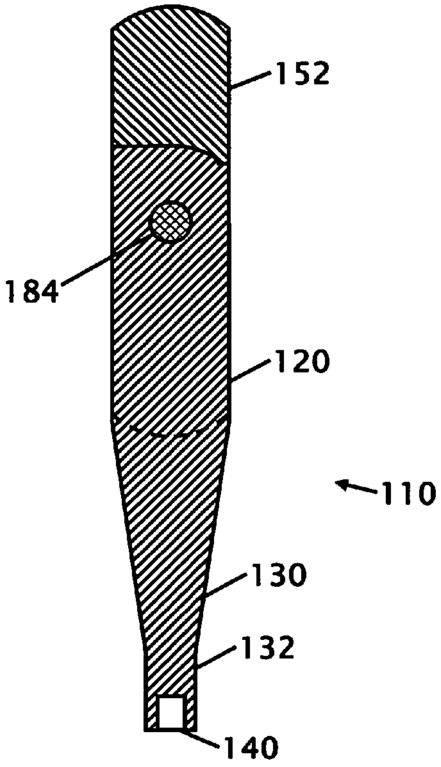
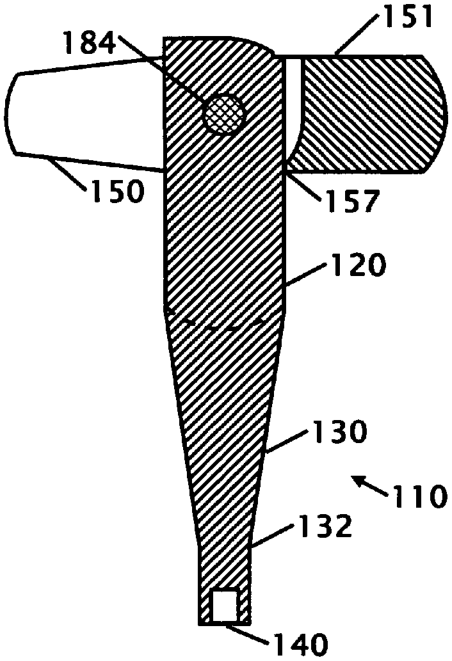
Figure 6
Figure 7

DRUM KEY HAVING DEPLOYABLE HANDLE

FIELD OF THE INVENTION

This invention relates to improvements to the design of a drum key. More particularly, the present key consists of a square drive key with an elongated body. Within the body, deployable arms or wings are contained such that when the body of the key is articulated the arms or wings are deployed providing lever arms for turning the drum key.

BACKGROUND OF THE INVENTION

Most keys used for tightening or tuning the heads of a drum are made from a single casting or molded part. These keys maintain the same shape both when they are being used and when they are being stored. Other keys require some assembly before they are used on a drum bolt. Various drum key tightening devices have been patented and are described herein to provide a background regarding the superiority of the proposed drum key.

The majority of drum keys that are available today consist of an essentially flat "T" shaped key where the drive socket in on the bottom of the "T" shape. Exemplary examples of these keys are found in design patents D166,457 issued to H. Dreyfuss on Apr. 15, 1952, D346,100 issued to Eric J. Behrenfeld on Apr. 19, 1994, and D407,895 issued to James A. Staley on Apr. 13, 1999 Utility patent U.S. Pat. No. 5,193,418 issued to Eric J. Behrebfeld on Mar. 16, 1993 is another example of this style of key. In Dreyfuss '457 the shaft of the key is a cylinder with an "S" shaped turning handle fixed on the cylinder. In Behrenfeld '100 and '418 the key consists of a cylinder with a recess for a drum bolt. The other end of the key includes wings for tightening the bolts. The winged end further includes an open hoop for attaching the key to a support tube typically located on a drum stand. In Staley '895 the cylindrical drum key includes wings with an additional driving recess located in the wing section. This patent further includes a carrying holster for clipping the holster onto a belt or key ring. All of these patents consist of a static casting or molding where the gripping and torqueing wings exist in a fixed orientation relative to the body of the key.

U.S. Design Pat. No. D404,986 issued to John E. Mahon on Feb. 2, 1999 disclose a homogeneous drum key with a hole molded eccentric with the axis of the bolt tightening hole. The hole allows a user to more quickly secure the drum head onto the drum by placing the key onto the bolt and then inserting a finger into the hole and rotating the key around the tightening bolt. While this patent shows another embodiment of a tightening key the part is fabricated from a homogeneous material and the arms are located in a fixed orientation relative to the central body of the drum key.

U.S. Design Pat. No. D472,114 issued to Palecki et al. on Mar. 25, 2003 disclose a turbotune drumkey. This key can be either used manually with the fixed extended wings or can be attached to a drill or driver for quickly tightening or adjusting drum bolts. While this tool allows for tightening drum bolts, the wings or arms are fixed on the tool and are not extendable.

U.S. Pat. No. 5,394,775 issued to Jon E. Fagerstrom on Mar. 7, 1995 discloses a musical drum precision tuning tool that allows the bolts to be torqued to an even level. The tool is basically an "L" shaped tool and does not extend or deploy arms to allow the tightening of bolts.

Published application US 2003/0159550, by Fumihiro Shigenaga, published Aug. 28, 2003 discloses a drum tuning key. The key is an "S" shaped tool where one end of the tool is placed on a bolt head and the other end can be turned to tighten the bolts. The tool is made from multiple castings or bent metal members but does not extend or deploy.

What is needed is a drum bolt adjusting tool where the tool exists as a cylindrical member and when the tool is articulated the cylindrical tool opens to provide wings or arms that can be gripped to tighten the bolts. The proposed tool satisfies these needs by providing a tool that extends to provide a gripping surface to tighten drum bolts.

BRIEF SUMMARY OF THE INVENTION

It is an object of the drum key to provide a recess that is configured to fitting on the end of a drum adjusting bolt. The drum bolt is typically square headed and the proposed tool fits over the bolt for adjustment and is easily removed from the bolt for adjusting of other bolts. The head of the tool is larger in diameter from the tool section. The tool section is tapered or smaller in diameter than the body to allow for clearance in and around the head of the bolt on the drum. The body of the tool is larger in diameter than the tool portion to provide for storage for the wings or arms and to provide a greater gripping diameter when the tool is collapsed.

It is another object of the drum key to make the key out of a material that provides sufficient structural strength for extended use. The materials for the key include the use of metals and or plastics that provide superior performance. It is also an object for the key to have serviceable parts that allow for changing components that may wear such as the bolt socket.

It is another object of the drum key to provide the drum key in a cylindrical closed orientation. The cylindrical configuration allows the tool to be used to quickly provide initial tightening of the drum bolts. The side of the key can be knurled or have other similar surface detailing that makes the key easier to grip and turn in its closed configuration.

It is another object of the drum key to provide a drum key that has arms or wings that extend when the drum key is articulated. The articulation is from rotation, extension, lifting or other motions upon the barrel of the key to deploy the arms or wings to provide an extended gripping surface. After use of the key the arms or wings can be reset and locked into the body of the drum key to return the key to the essentially cylindrical shape.

It is still another object of the drum key tool to provide a gage or markings on the tool that provides a measurement function to ensure even locating of the drum head or skin on the drum. When the drum head is first placed over the end of the drum and is initially secured the drum head may not be evenly seated on the end of the drum. Steps, indicia or a cam shape on the tool allows marking to identify the spacing between the drum head and the tightening rings. This improves the even tuning of the drum.

Various objects, features, aspects, and advantages of the present invention will become more apparent from the following detailed description of preferred embodiments of the invention, along with the accompanying drawings in which like numerals represent like components.

BRIEF DESCRIPTION OF THE DRAWINGS

FIG. 5 shows an isometric view of the drum key according to a second preferred embodiment.

FIG. 6 shows a top sectional view of the drum key from claim 5 with the extendable members enclosed within the body of the tool.

FIG. 7 shows a top sectional view of the drum key from claim 5 with the extendable members extending from the body of the tool.

DETAILED DESCRIPTION

Figure 1:
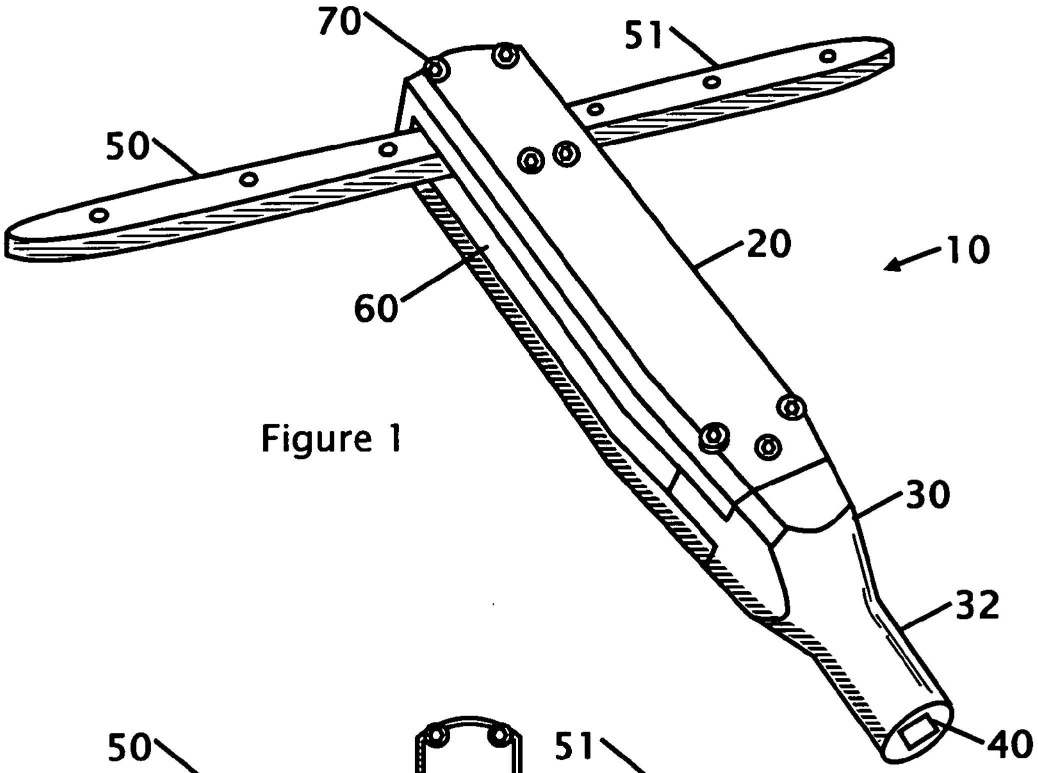
FIG. 1 shows an isometric view of the drum key according to a first preferred embodiment.
Figure 2:
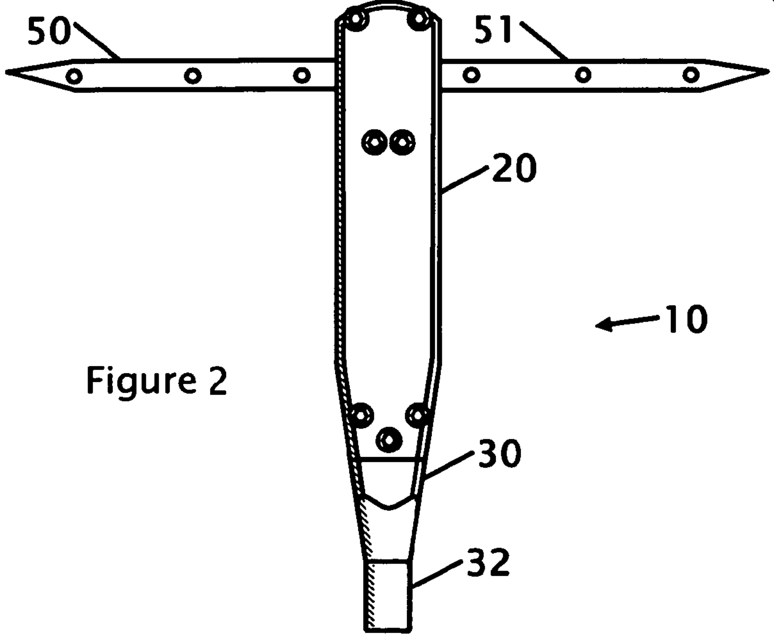
FIG. 2 shows a top view of the drum key from FIG. 1
Figures 3, 4:
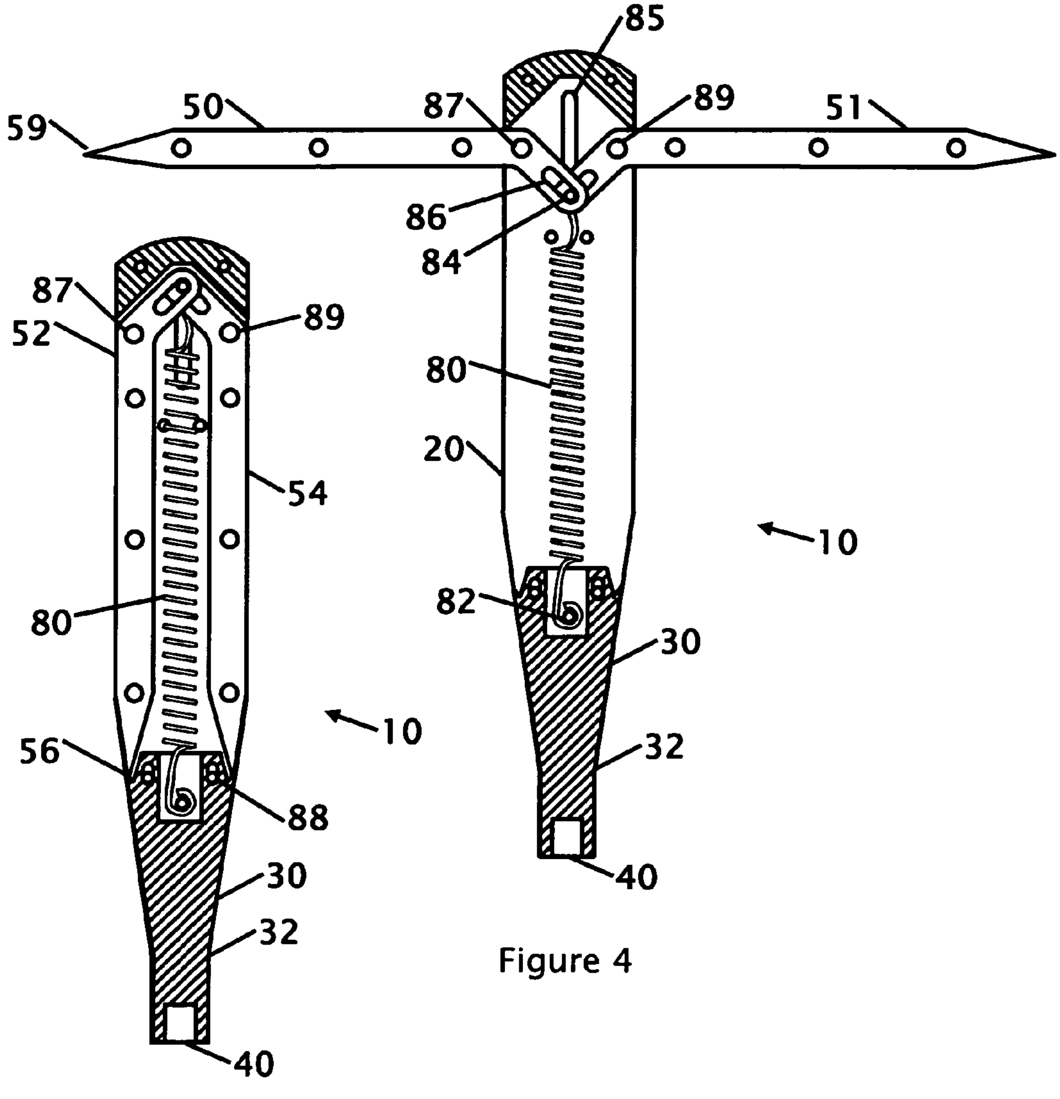
FIG. 3 shows a top sectional view of the drum key from claim 1 with the extendable members enclosed within the body of the tool.
FIG. 4 shows a top sectional view of the drum key from claim 1 with the extendable members extending from the body of the tool.

FIGS. 1-4 show various views of the drum key according to a first preferred embodiment 10. In FIG. 1 an isometric view is shown. In FIG. 2 a top view is shown. In FIG. 3 a top sectional view is shown with the extendable members enclosed within the body of the tool. In FIG. 4 a top sectional view of the drum key us shown with the extendable members extending from the body of the tool. The tool 10, consist essentially of an elongated body 20. In the preferred embodiment the body 20 is square or rectangular in cross section with chamfered corners. This preferred embodiment makes to tool easier to hold and turn when the arms 50 and 51 are not deployed. While the preferred embodiment of the shape has been described as an essentially rectangular body, the body can also be cylindrical, hexagonal or another shape in cross section. The elongated shape further allows a user to grasp and turn the tool quickly to provide initial bolt tightening. The sides of the tool and or the arms or wings can be textured or knurled to improve gripping and turning of the tool. At one end of the tool the body tapers 30 to a narrower area 32.

The narrower area allows for clearance between the key and the side of a drum while it is being used without rubbing or interfering with the counter hoop or hoop that extends around the drum. A recess 40 allows for the tool to engage in the head of a bolt used to stretch and tune a drum head or skin. The recess is usually a ¼ inch raised bolt head. While in the preferred embodiment the tool is intended for use as a drum key is contemplated that the recess allows adjustment of different sized bolts as well as allow for the changeability of the driving recess.

Fastening hardware 70 secures the construction of the tool that is made from a sandwich of several layers. In the construction of the tool a recess 60 exists on both sides of the tool to allow for the arms 52 and 54, as shown in the closed position and 50 and 51 in the open position. The arms pivot at pivot points 87 and 89 to move between the retracted and extended positions. In this embodiment the arms are linked with a mechanical linkage that articulates the arms to move in unison. A pin 84 extends through slots 86 that exist in both arms. The pin 84 passes into a slot 85 that exists in the bottom and top housing. A spring 80 is attached to the pin 84 to pull the arms in unison. The arms are maintained in the closed position when the tips 59 of the arms are tucked under the housing at location 56. The lower housing is connected to the other end of spring 80 with the pin or fastener 82.

Fasteners 88 are placed through elongated holes to allow the two halves of the tool to be drawn apart slightly to release the tips 59 of the arms to clear the retention tabs 56. Once the tips 59 clear the retention tabs 56 the spring 80 pulls the arms out to full extension. With the arms fully extended the user can exert more torque on the lever arms of the drum key to tighten or adjust the drum. In this embodiment the arms are shown mechanically linked in one contemplated embodiment. It is further contemplated that the tips can include a flat or Philips head for use as a screwdriver. Other contemplated embodiments are possible that allow for equivalent deploying of the arms. It is further contemplated that each arm can act independently to allow for the extension of only one arm to allow for additional clearance where two extended arms could cause interference with an obstruction placed near the drum being adjusted. Some other embodiments that provide for a drum key with deployable arms are disclosed in the additional figures.

FIGS. 5-7 show various views of the drum key according to a second preferred embodiment 110. In FIG. 5 an isometric view is shown. In FIG. 6 a top sectional view is shown with the extendable members enclosed within the body of the tool. In FIG. 7 a top sectional view of the drum key us shown with the extendable members extending from the body of the tool. The tool 110, consist essentially of an elongated body 120. At one end of the tool the body tapers 130 to a narrower area 132. The necked area allows for clearance for the key between the counter hoop or hoop that extends around the drum. Recess 140 allows for the tool to engage in the head of a bolt used to stretch and tune a drum head or skin. In this second preferred embodiment the wings or arms are deployed by rotating or folding the tool about a pivot point 184 located in the middle area of the tool. This pivot point allows the tool to convert from an elongated cylindrical shape to a "T" shaped tool. A shoulder 156 prevents the arms of the tool from rotating too far past vertical 152. A second stop 157 prevents the arms from rotating past a perpendicular orientation.

In this embodiment the arms 150 and 151 are configured a "U" shape where they saddle and pivot about the body of the tool. One or more of the wings 190 of the tool have a tapered area. The tapered area includes markings 195 to provide a measurement gauge for initial or final adjusting of the drum head or skin. In operation a new or different drum head or skin is brought over a drum shell. The tension bolts or rods are initially tightened to pull the drum head over the drum shell. In order to provide an even playing tone for the drum the drum head should be evenly drawn over the sides of the drum shell. One way to ensure the head is evenly drawn over the drum shell is to measure the gap in the drum frame. Various marking indicia 195 can be used. Contemplated indicia including numerical values and or suggested positioning locations.

Figure 8:
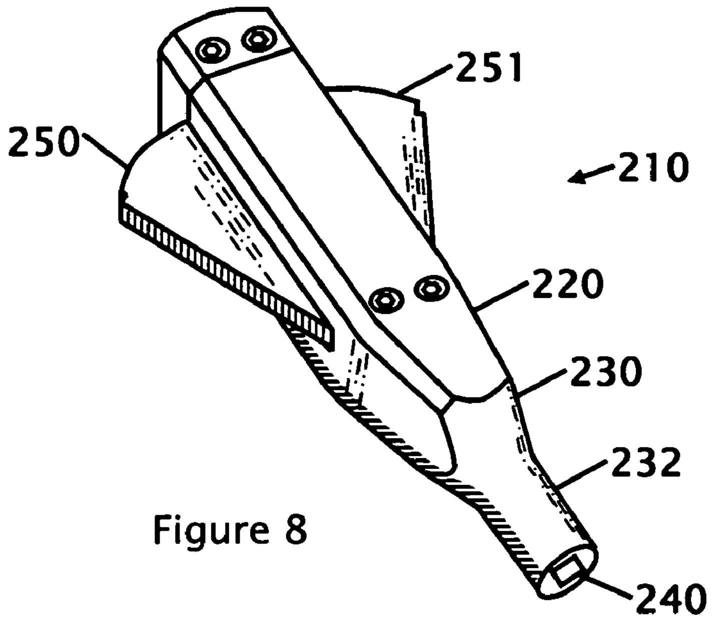
FIG. 8 shows an isometric view of the drum key according to a third preferred embodiment.
Figure 9:
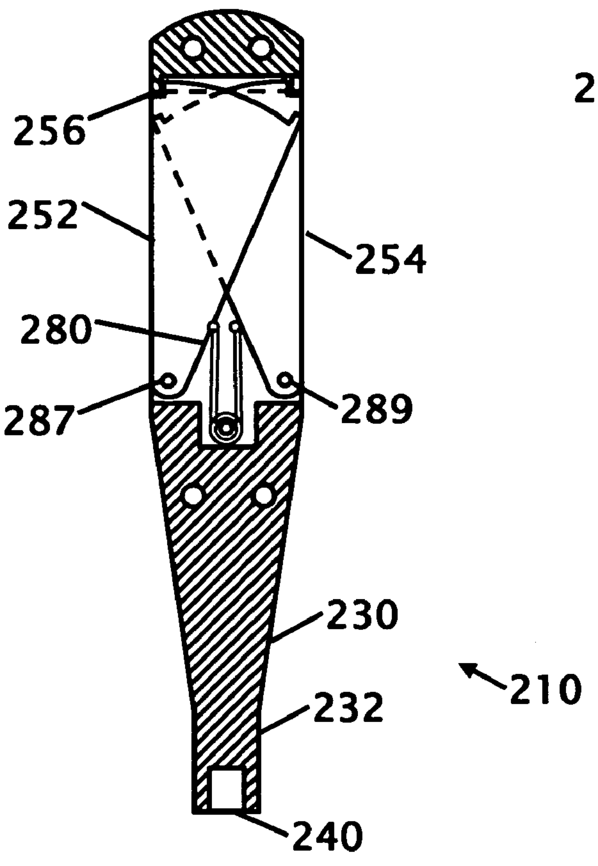
FIG. 9 shows a top sectional view of the drum key from claim 8 with the extendable members enclosed within the body of the tool.
Figure 10:
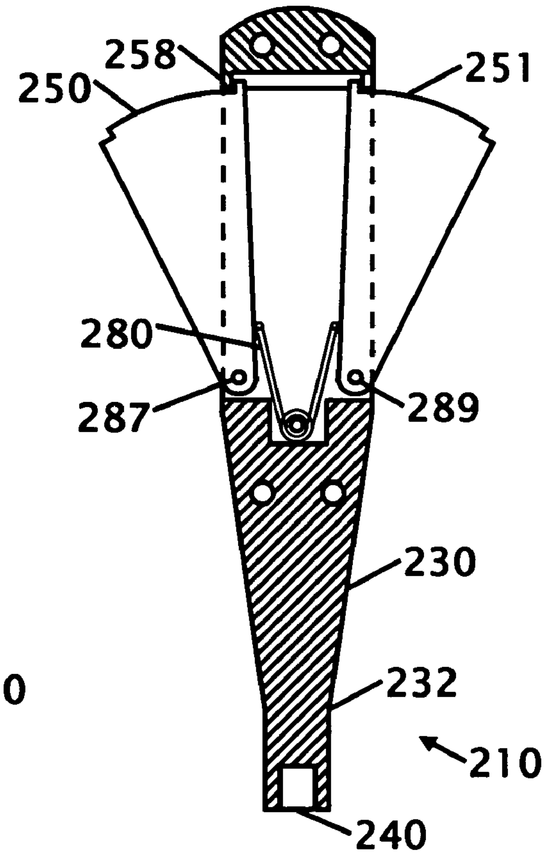
FIG. 10 shows a top sectional view of the drum key from claim 8 with the extendable members extending from the body of the tool.

FIGS. 8-10 show various views of the drum key according to a second preferred embodiment 210. In FIG. 8 an isometric view is shown. In FIG. 9 a top sectional view is shown with the extendable members enclosed within the body of the tool. In FIG. 10 a top sectional view of the drum key as shown with the extendable members extending from the body of the tool. The tool 210, consist essentially of an elongated body 220. At one end of the tool the body tapers 230 to a narrower area 232. The necked area allows for clearance for the key between the drum tension bolts or rods and the drum head or skin. Recess 240 allows for the tool to engage in the head of a bolt used to stretch and tune a drum head or skin. In this third preferred embodiment the tapered or pie shaped wings or arms are deployed by rotating the two halves of the tool clockwise or counterclockwise to release the wings. In another contemplated method deploying the wings the two halves of the tool are pulled apart, depressing a button, lifting or squeezing a part of the tool. The wings are maintained within the body of the housing with tabs 256. The pie shaped wings are shown as 252 and 254 in the closed orientation and as 250 and 251 in the open orientation.

When the tool is articulated to release the tabs 256, torsional spring 280 pushes the wings outside of the tool where the second tab 258 prevents the wings from being pushed outside of the housing. The wings pivot about pivot points 287 and 289. In this contemplated embodiment the wings can be pushed inward where they lock back under the top part of the tool.

Thus, specific embodiments of drum keys with extendable members have been disclosed. It should be apparent, however, to those skilled in the art that many more modifications besides those described are possible without departing from the inventive concepts herein. The inventive subject matter, therefore, is not to be restricted except in the spirit of the appended claims.

What is claimed is:

1. A drum key comprising:
- an elongated body;
- one end of the elongated body having a recess configured for adjusting fasteners used with drums;
- at least one member disposed in the elongated body such that;
- when the body is articulated the at least one member disposed in the elongated body pivots on or about a point located within or on the elongated body to deploy beyond the side of the elongated body to provide a wider griping surfaces for tightening a drum bolt placed in the aforementioned recess.

2. The drum key according to claim 1 in which the articulation of the elongated body is with pulling, rotating, folding or unfolding the drum key from the opposing ends of the elongated body.

3. The drum key according to claim 1 in which the articulation of the elongated body is from depressing on one or more locations on the elongated body.

4. The drum key according to claim 1 in which the recess configured for adjusting bolts used in drums is square, slotted, rectangular or hexagonal in cross section and may allow for replacement and or changing of the recess.

5. The drum key according to claim 1 in which the at least one member disposed in the elongated body is an elongated arm or pie shaped wing.

6. The drum key according to claim 1 further includes an extension, compression or torsional spring that at least partially extends the at least one member disposed in the elongated body outside of the body of the drum key.

7. The drum key according to claim 1 in which the at least one member disposed in the elongated body is a “U” shaped member where the open portion of the “U” saddles the elongated tool.

8. The drum key according to claim 1 in which two members deploy together and essentially operate together.

9. The drum key according to claim 1 that further includes a measurement gauging indicator to identify the adjustment height of a drum head.

10. A drum key comprising:
- an elongated body;
- one end of the elongated body having a recess configured for adjusting bolts used with drums;
- at least one member disposed on the side of the elongated body such that;
- when the body is articulated the at least one member disposed on the side of the elongated body rotates away from the side of the elongated body to provide a wider griping surfaces for tightening a drum bolt placed in the aforementioned recess.

11. The drum key according to claim 10 in which the articulation of the elongated body is with pulling, rotating, folding or unfolding the drum key from the opposing ends of the elongated body.

12. The drum key according to claim 10 in which the articulation of the elongated body is from depressing on one or more locations on the elongated body.

13. The drum key according to claim 10 in which the recess configured for adjusting bolts used in drums is square, slotted, rectangular or hexagonal in cross section and may allow for replacement and or changing of the recess.

14. The drum key according to claim 10 in which the at least one member disposed on the side of the elongated body pivots on or about a point located within or on the elongated body as it deploys.

15. The drum key according to claim 10 in which the at least one member disposed on the side of the elongated body is an elongated arm or pie shaped wing.

16. The drum key according to claim 10 further includes an extension, compression or torsional spring that at least partially extends the at least one member disposed on the side of the elongated body further away from the body of the drum key.

17. The drum key according to claim 10 in which the at least one member disposed in the elongated body is a “U” shaped member where the open portion of the “U” saddles the elongated tool.

18. The drum key according to claim 10 in which two members deploy together and essentially operate together.

19. The drum key according to claim 10 that further includes a measurement gauging indicator to identify the adjustment height of a drum head.

* * * * *